May 26, 1942. H. I. MORRIS 2,283,941
WELDING APPARATUS
Filed March 1, 1940 7 Sheets-Sheet 2

INVENTOR
HOWARD I. MORRIS
BY Geo. B. Pitts
ATTORNEY

May 26, 1942.　　　　H. I. MORRIS　　　　2,283,941

WELDING APPARATUS

Filed March 1, 1940　　　　7 Sheets-Sheet 3

INVENTOR
HOWARD I. MORRIS
BY
Geo. B. Pitts
ATTORNEY

May 26, 1942.  H. I. MORRIS  2,283,941
WELDING APPARATUS
Filed March 1, 1940  7 Sheets-Sheet 4

INVENTOR
HOWARD I. MORRIS
BY Geo B. Pitts
ATTORNEY

INVENTOR
BY HOWARD I. MORRIS
Geo. B. Pitts
ATTORNEY

Patented May 26, 1942

2,283,941

UNITED STATES PATENT OFFICE 2,283,941

WELDING APPARATUS

Howard I. Morris, Lakewood, Ohio, assignor of one-third to Carl M. Yoder and one-third to Harvey O. Yoder, both of Lakewood, Ohio Application March 1, 1940, Serial No. 321,745

10 Claims. (Cl. 219—6)

This invention relates to welding apparatus of the resistance type having rotatable electrodes. In the disclosure herein the electrodes are rotated by the moving work due to their engagement therewith, but so far as the present invention is concerned they may be otherwise positively driven. In a construction having rotatable electrodes it is desirable to (a) simplify the connections, both mechanical and electrical, between the electrodes and the secondary windings of the transformer, and (b) eliminate the employment of a specially designed transformer, whereby installation costs, as well as current losses, are materially reduced.

One object of the invention is to construct an improved rotatable mounting whereby varying types of transformers of conventional construction may be supported in relation to the electrodes to provide direct connections between them and the secondary windings of the transformer. In securing these advantageous results I (a) employ for illustrative purposes a transformer of the type having parallelly related coils, the cost of which is considerably less than all transformers connected to and rotated with rotatable electrodes, of which I have knowledge and (b) provide an arrangement wherein a transformer of the conventional type and the welding electrodes rotate as a unit, with the electrodes directly connected to the secondary windings of the transformer.

Another object of the invention is to provide an improved rotatable mounting for a transformer of the type referred to wherein the transformer is mounted between spaced bearings and the electrodes are disposed outwardly of one bearing, whereby the electrodes are freely accessible.

Other objects of the invention will be apparent to those skilled in the art to which my invention relates from the following description taken in connection with the accompanying drawings, wherein

Fig. 7b is a section on the line 7b—7b of Fig. 7a.

In the drawings, referring particularly to Figs. 1 to 8, inclusive, I indicates as an entirety a frame of any desired construction forming a supporting member for a supporting means, indicated as an entirety at 2, on which a transformer 3 and its mounting (the latter being indicated as an entirety at 2'), are positioned. The transformer 3 comprises a core 3', primary windings 3a and secondary windings 3b (see Figs. 2 and 7a) having terminals 3b' connected to electrodes 4, 4a, in the manner later set forth. The frame I also provides a bed Ia for a casing 5 arranged to house suitable supporting means (not shown) for shafts 5a which are provided with work supporting and guide devices 6, the latter being illustrated as rolls rotatable on the shafts 5a and adapted to engage pipe A the seam of which is to be welded. The rolls 6 may be secured to the shafts 5a and the latter driven by means (not shown) within the casing 5. The rolls 6 are removable, whereby they may be replaced by other rolls dependent upon the size of the pipe to be welded. The casing 5 is adjustable on the bed Ia transversely to the direction of feed of the pipe A by means of a screw 7. The mechanism for delivering the pipe A to the rolls 6 is not shown as it forms no part of the present invention.

Figure 1:
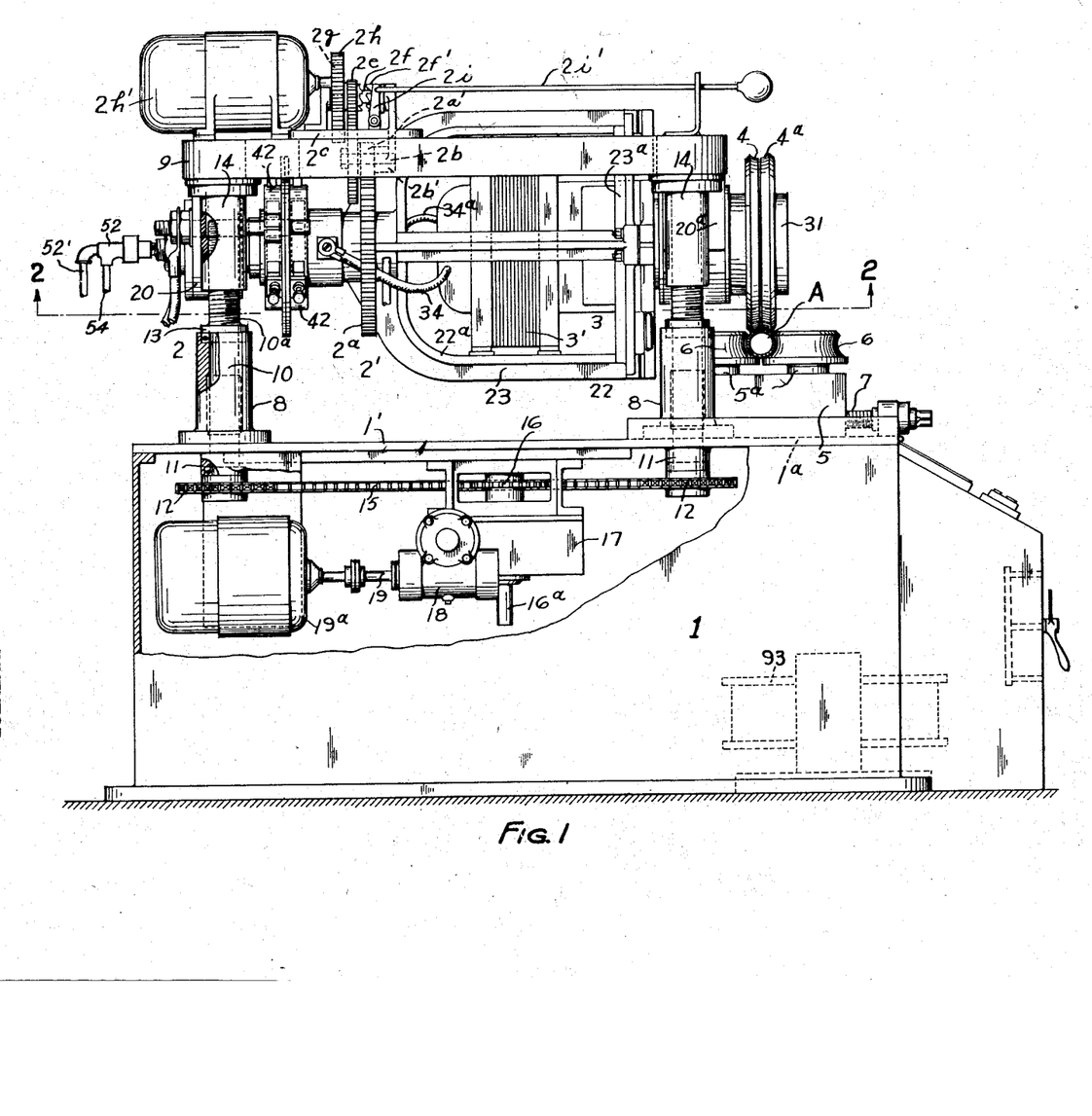
Fig. 1 is a side elevation of a welding apparatus embodying my invention, parts being broken away.
Figure 2:
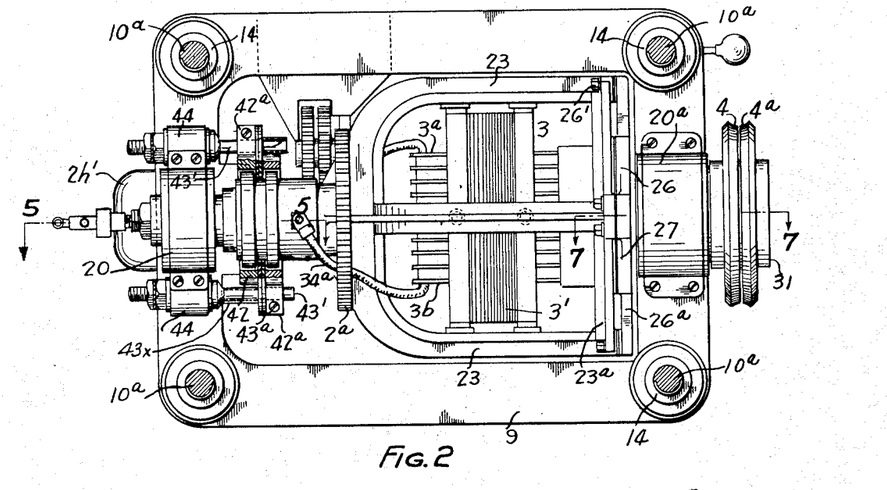
Fig. 2 is a section on the line 2—2 of Fig. 1.
Figures 3, 4:
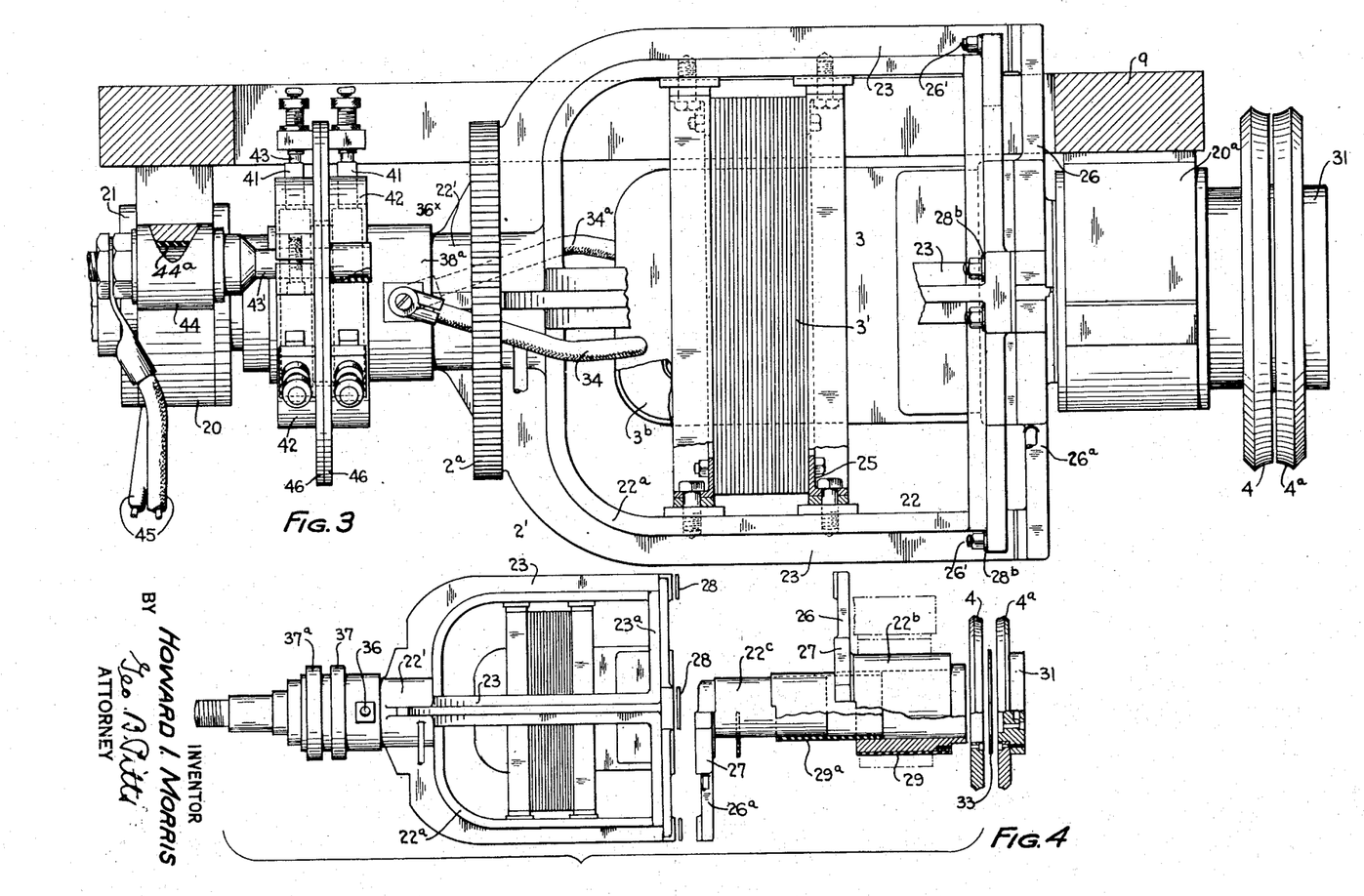
Fig. 3 is an elevation of parts shown in Fig. 1, namely, the transformer and electrodes and the mounting therefor, enlarged.
Fig. 4 is a view of parts shown in Fig. 3, in separated relation.

Of the supporting means 2, 8 indicates a plurality of upright members (preferably four in number) suitably fixed to the top wall I' of the frame I and arranged to support thereabove a separate frame 9 preferably of substantially rectangular shape, whereby portions of the mounting 2' and transformer 3 may be positioned within the frame to reduce the overall height of the apparatus. For reasons later set forth, the frame 9 is adjustable vertically on the members 8 by the following instrumentalities: 10 indicates a shaft extending through each member 8, which is provided with suitable bearings therefor, and a hollow boss 11, provided on the lower side of the top plate 1' of the frame 1. Each shaft 10 is provided on its lower end with a sprocket 12 for a purpose later set forth and intermediate its ends it is provided with a collar 13 adapted to engage the upper bearing (which is preferably adapted to take thrusts) in the adjacent member 8. The upper portions of the shafts 10 are provided with screw threads 10a which engage threads on the inner walls of tubular members 14, one for each shaft 10, fixed to and depending from the frame 9, the members 14 serving as nuts so that when the shafts 10 are rotated the frame 9 is raised or lowered according to the direction of rotation of the shafts. The shafts 10 are rotated simultaneously in the same direction preferably by means of an endless chain 15 engaging a driven sprocket 16 fixed to a shaft 16a, which is mounted in the walls of a gear box 17, and drivingly connected through a suitable gear reduction within a casing 18 to the shaft 19 of a motor 19a.

20, 20a, indicate standards bolted to and depending from the end bars of the frame 9, each standard being provided with bearings 21 for the mounting 2', one of said bearings being arranged to take end thrusts. In the arrangement illustrated, the bearing 21 remote from the electrodes 4, 4a, is of the double tapered roller bearing type, whereas the other bearing 21 is of a type to prevent axial movement of the mounting (a plane bearing being shown for illustrative purposes) should expansion and contraction of the parts mounted therein due to heating thereof, take place.

The mounting 2' consists of a member 22 rotatably mounted in the bearings 21 and comprising three sections 22a, 22b and 22c, the transformer 3 being secured to and mounted within the section 22a and the sections 22b, 22c, being connected to but insulated from the section 22a and forming the conductors from the terminals 3b' of the secondary windings 3b to the electrodes 4, 4a, respectively. The section 22a preferably consists of a cage-like device having a plurality of arms 23 integrally connected together at their ends adjacent to the electrodes by bars 23a and connected integrally at their opposite ends to a hub 22'. The hub 22' is rigidly connected to a shaft 24, disposed in line with an imaginary center about which the arms 23 are positioned and mounted in and extending through the adjacent bearing 21. The section 22a is preferably provided with four arms 23, the core 3' of the transformer being rigidly secured by angles 25 to one or more of the arms 23 (preferably all thereof—see Fig. 3). The sections 22b, 22c, consist of outer and inner concentrically related devices extending through the adjacent bearing 21 (the outer device being mounted in the bearing) and provided at their inner ends with oppositely disposed, radially extending plates 26, 26a, respectively, each rigidly connected at their outer ends (preferably by bolts 26') to the outer ends of the arms 23, whereby the sections of the member 22 are rigidly connected together. The plates 26, 26a, are provided with pads 27 which are rigidly secured to the terminals 3b' by cap screws 3b" to form an electrical contact therewith. As the conductor the devices 22b, 22c, are formed of conducting material (such as copper), the current flows from the terminals 3b' to the electrodes 4, 4a. Each plate 26, 26a, is insulated from the adjacent arms 23 by insulation material 28 and each bolt 26' is surrounded by a bushing 28a of insulation material and the nut for each bolt 26' engages with a washer 28b of insulation material. A bushing 29 formed of insulation material surrounds the conductor device 22b to insulate it from its bearing 21 and a sleeve 29a of insulation material is interposed between the conductor devices 22b, 22c; also a section 29b of insulation material is interposed between the inner end of the conductor device 22b and the plate 26a.

Figures 7, 8:
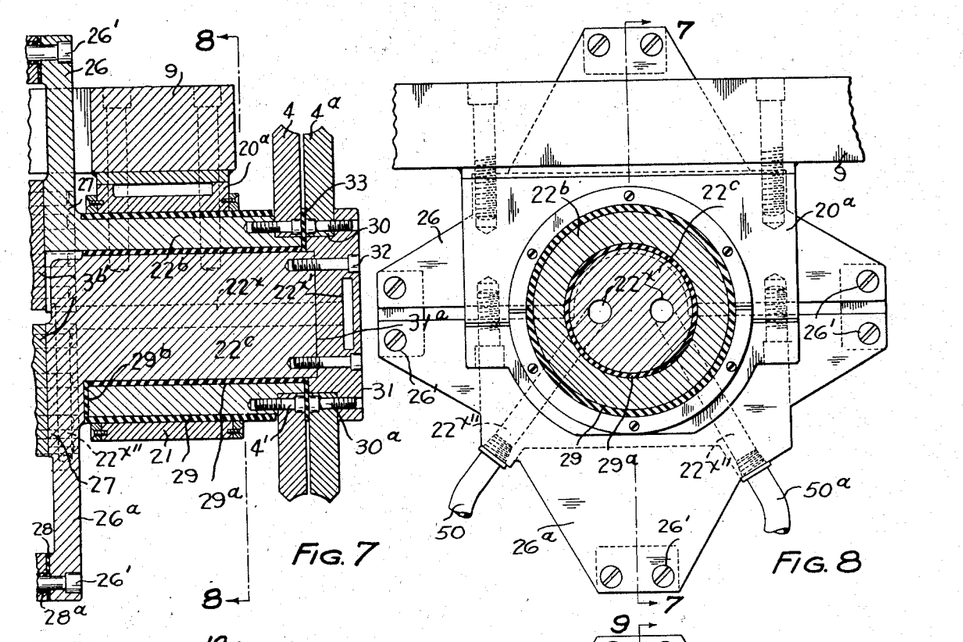
Fig. 7 is a fragmentary section on the line 7—7 of Fig. 2, enlarged.
Fig. 8 is a section on the line 8—8 of Fig. 7.

The outer end portion of the conductor device 22b is reduced to form a seat for the inner peripheral portion of the electrode 4 which is secured to the device by screws 4'. The inner peripheral portion of the electrode 4a fits an annular seat 30 formed in a cap 31, formed of conducting material, such as copper, and is secured to the latter by screws 30a and the inner wall of the cap is centrally recessed at 31a to fit over the outer end of the conductor device 22c, to which the cap is secured by screws 32. A ring 33 formed of insulation material is positioned between the electrodes 4, 4a, and adjacent portions of the conductor device 22b and cap 31. By means of the engagement of the electrode 4 with the conductor device 22b and the electrode 4a through the cap 31 with the conductor device 22c, the electrodes have direct electrical connections with the terminals 3b', so that loss of current is reduced to a minimum.

Figure 5:
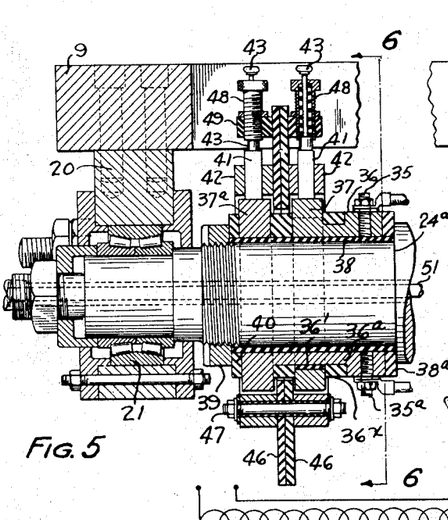
Fig. 5 is a fragmentary section on the line 5—5 of Figs. 2 and 6.
Figure 6:
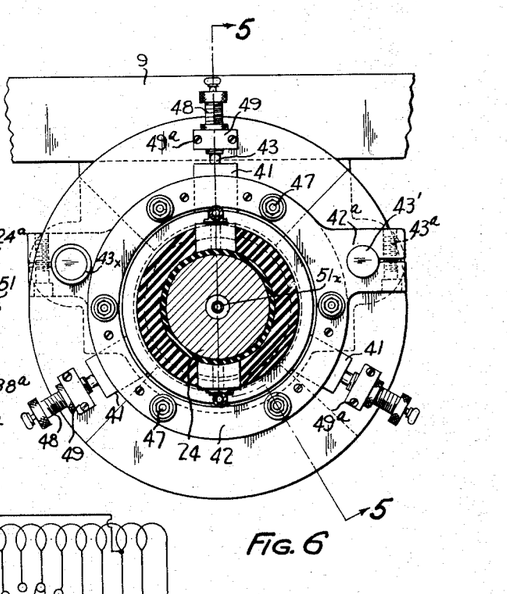
Fig. 6 is a section on the line 6—6 of Fig. 5.
Figure 7A:
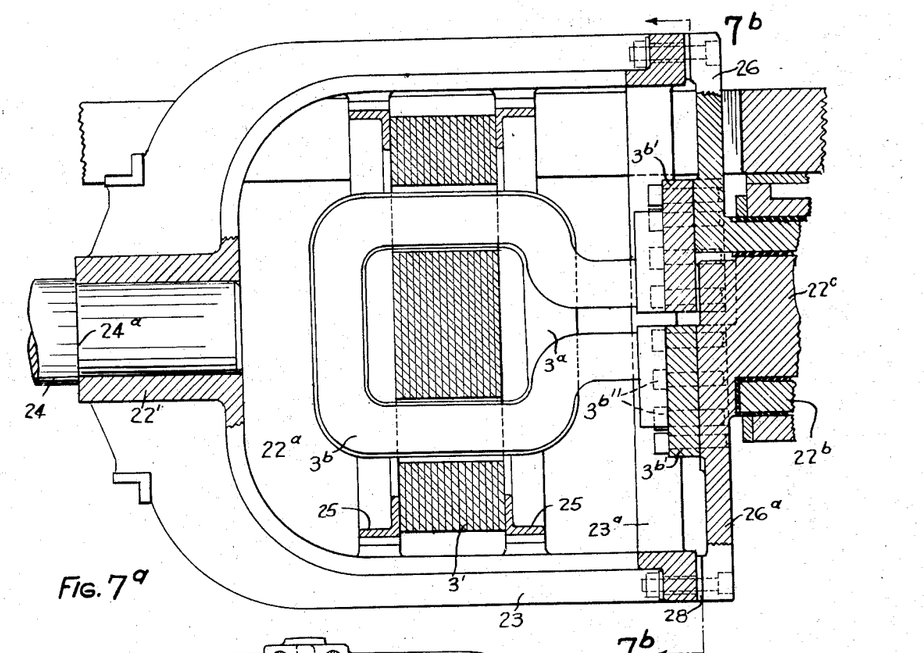
Fig. 7a is a fragmentary section on the line 7a—7a of Fig. 2.
Figure 7B:
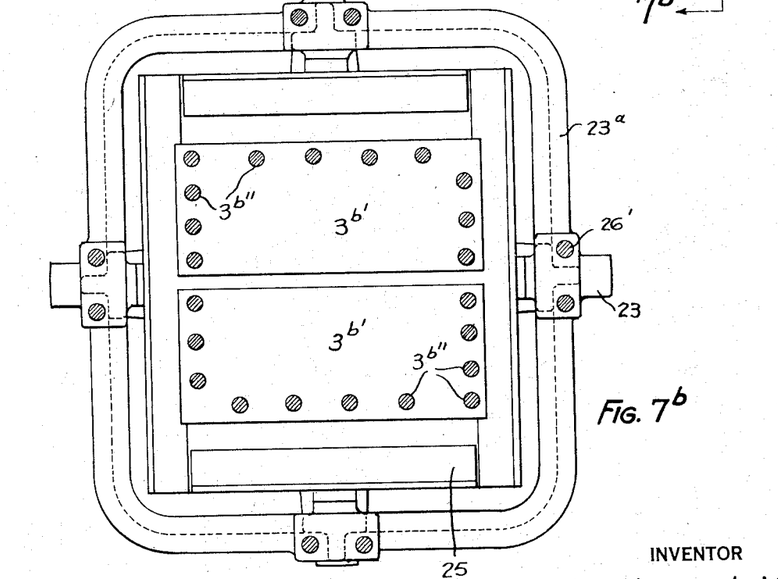

The electrical connections to the primary windings 3a comprise the following: 34, 34a, indicate leads leading from terminals 35, 35a, to the primary windings 3a, the terminals being connected to conductors 36, 36a, respectively, and the latter in turn being connected at their outer ends to current collecting rings 37, 37a, respectively; each conductor being preferably formed integrally with the adjacent ring. The conductors 36, 36a, are insulated from each other and the hub 22' by suitable insulation material 36x. As shown in Fig. 5, the rings are insulated from each other by an annulus 37' formed of insulating material and the ring 37 is cut away to accommodate the conductor 36a, a section 36' of insulation material being interposed between the conductor 36a and ring 37. The conductors 36, 36a, and the rings 37, 37a, are insulated from the shaft 24 by a sleeve 38 formed of insulation material. The rings 37, 37a, annulus 37' and sleeve 38 are secured in position by a nut 39 threaded on the shaft 24 against a washer 40 formed of insulation material and arranged to clamp these parts against the end wall of the hub 22'. As shown, the collecting rings 37, 37a, are mounted on the shaft 24 inwardly of the adjacent bearing 21. Each collecting ring 37, 37a, is engaged by one or more brushes 41 (preferably three thereof), each slidably fitting a radially disposed opening formed in an annulus 42 and normally pressed toward the adjacent ring by a spring operated plunger 43. Each annulus 42 is provided with a laterally extending lug 42a formed with a transverse opening into which extends the inner end of a terminal member 43', the lug 42a being split on one side so that by means of a screw 43a extending through one of the split portions and threaded into other portion the member 43' may be rigidly secured to the lug 42a. The outer end portion of each terminal member 43' extends through a boss 44 provided on the adjacent standard 20 and has connected to its outer end a lead 45. The boss 44 is provided with a sleeve 44a formed of suitable insulation material (see Fig. 3) to insulate the terminal from the boss. 46 indicates a pair of annular disks formed of suitable insulating material, such as Bakelite or Micarta, disposed between the annuli 42 and secured together face to face by bolts 47. As shown in Fig. 5, the bolts 47 extend through alined openings formed in the annuli 42 and disks so as to secure the annuli and disks in rigid relation, the bolts 47 and the nuts thereon being suitably insulated from the annuli 42. Each of the plungers 43 and its operating spring for each brush 41 are mounted in a casing 48, the external wall of which is provided with screw threads and threaded into an opening formed in a block 49, the screwing in or out of the casing 48 serving to adjust the tension of the spring for the adjacent plunger 43. Each block 49 is secured to the outer face of the adjacent disk 46 by screws 49a as shown in Figs. 5 and 6. The disks 46 are formed in sections which overlap for obvious reasons, and formed with alined openings to receive the terminals 43', whereby the latter support the disks and annuli in position. The outer end portion of that terminal 43' which is connected to the ring 37a is enclosed by a hood 43x formed of insulating material due to the close proximity of the terminal 43' to the adjacent annulus 42, whereas the intermediate portion of that terminal 43' which is connected to the ring 37 is surrounded by a sleeve 43x' formed of insulating material due to the close proximity of the terminal 43 to the adjacent annulus 42.

The conductor device 22c is formed with conduits 22x connected at their outer ends by a passage 22x' formed in the cap 31, for the circulation of a cooling medium (such as water). The inner ends of the conduits 22x are connected to branch conduits 22x" formed in the plate 26a (see Fig. 8), the latter conduits being connected to flexible supply and discharge pipes 50, 50a, respectively. The supply pipe 50 is connected to a port formed in the hub 22' and shaft 24, which port communicates with a pipe 51 extending through a duct 51x formed axially in the shaft 24 and connected at its outer end by means of a fitting 52 to a supply pipe 52' leading from the source of supply under pressure for the cooling medium. The discharge pipe 50a is connected to a port formed in the hub 22', which port is connected to the inner portion of the duct 51x, the pipe 51 being of a size to form with the walls of the duct an annular space for the flow of the medium from the pipe 50a to the discharge conduit in the fitting 52. The discharge conduit is connected to a pipe 54 which preferably returns the cooling medium to its source of supply.

From the foregoing description it will be noted that the mounting 2' which carries the transformer 3 and electrodes 4, 4a, is mounted on the frame 9, which being adjustable, it may be operated to position the electrodes in engagement with pipes of different diameter or due to wear and/or grinding of the electrodes, as well as to effect the desired pressure between the electrodes and the pipe to insure welding.

I preferably provide means for rotating the mounting 2' when it is desired to grind the outer surfaces of the electrodes 4, 4a. These means may consist of a ring gear 2a suitably fixed to the hub 22' and meshing with a pinion 2a' rotatable on a shaft 2b which is supported by a bracket 2b', the latter depending from a plate 2c mounted on the frame 9. The hub of the pinion 2a' is fixed to a gear 2d which meshes with a pinion 2e, the latter being freely rotatable on a shaft 2f and provided with a clutch element arranged to be engaged and disengaged by a clutch element 2f' slidable on and splined to the shaft 2f so that when the clutch elements are engaged and the shaft 2f driven, power is transmitted through the gear train above referred to to rotate the mounting 2'. The shaft 2f is provided with a gear 2g which meshes with a pinion 2h fixed to the shaft of a motor 2h'. The clutch element 2f' is provided with a yoke, which is connected to a lever 2i, the latter being operated by a rod 2i' to throw in and out the clutch elements 2f'.

Figure 9:
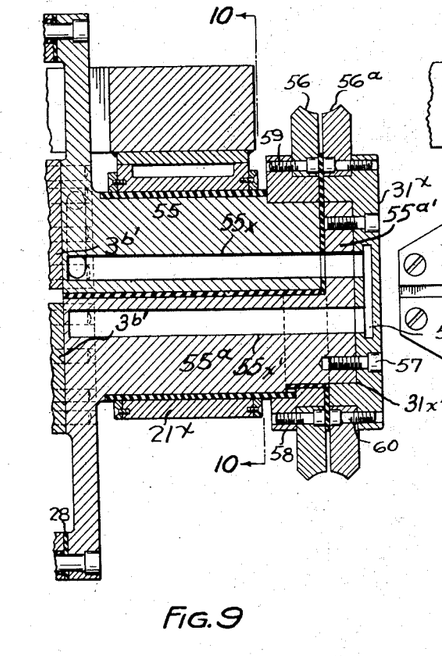
Fig. 9 is a section on the line 9—9 of Fig. 10, showing a modified form of construction.
Figure 10:
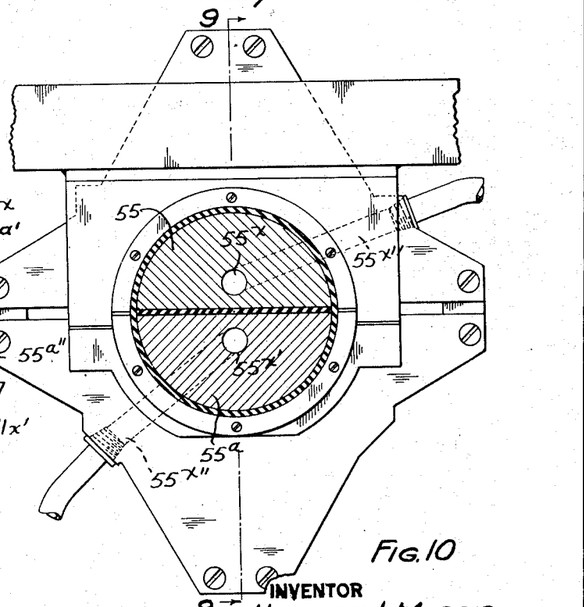
Fig. 10 is a section on the line 10—10 of Fig. 9.

Figs. 9 and 10 illustrate a modified form of construction wherein the conductor devices, indicated at 55, 55a, leading from the terminals 3b' and connected to the electrodes, indicated at 56, 56a, respectively, are of substantially semi-circular shape and arranged in side by side relation and rotate in the adjacent bearing 21x. The conductor device 55 is of less length than the conductor device 55a to accommodate a lateral extension 55a' on the outer end of the latter device. 31x indicates a cap formed on its inner face with a recess 31x' which fits over the extension 55a' and outer end of the device 55a and is secured thereto by screws 57. The outer walls of the conductor devices are cut away to form a seat for a removable ring 58 and the outer end portion of the ring in turn is reduced to form a seat for the inner periphery of the electrode 56, the latter being secured to the ring by screws 59. The inner end portion of the cap 31x is reduced to form a seat for the inner periphery of the electrode 56a, which is secured to the cap by screws 60. As the side walls of the cap 31x engage the outer end of the ring 58, it will be noted that the screws 57 secure it as well as the cap 31x in position. As shown in Fig. 9, the conductor devices 55, 55a, are insulated from the adjacent bearing 21x and from each other and the ring 58 is insulated from the cap 31x and conductor device 55a and the electrodes are insulated from each other. As the ring 58 and cap 31x are formed of conducting material, it will be seen that the current will flow direct from each terminal 3b' to one of the electrodes.

The cooling medium is circulated through a duct 55x formed in the conductor device 55, the extension 55a' and the insulation material between them to a chamber 55a" and returns from the chamber 55a" through a duct 55x' formed in the conductor device 55a, the inlet end of the duct 55x and outlet end of the duct 55x' being connected to supply and discharge branch ducts 55x" as shown in Fig. 10.

Figs. 12 to 15, inclusive, illustrate a form of construction wherein the mounting is modified to provide the bearing adjacent to the electrodes, indicated at 61, 61a, outwardly thereof. In this form of construction the conductor devices 62, 62a, are arranged concentrically and connected to the electrodes similarly to that shown in Figs. 1 to 7, inclusive, but the inner device 62a is provided with an extension 63 which extends through the cap 64 and is mounted at its outer end in anti-friction bearings 65. The bearings 65 are suitably mounted in a bracket 66 fixed to and depending from the adjustably mounted frame 9. In this form of construction the cap 64 and electrode 81a are preferably secured in position by a ring nut 67 threaded on the extension 63. This form of construction is advantageous when it is desired to provide anti-friction bearings for the mounting adjacent to the electrodes and provide a relatively small bearing to reduce friction losses. The bracket 66 is secured to the frame 9 or an extension 9a thereon in any desired manner, but preferably by a nut 68 threaded on the outer end portion of a pin 69 extending outwardly from the extension 9a. The bearing 65 is suitably insulated from the walls of the bracket 66 by insulation material 70 (see Fig. 13).

Figures 16, 17, 18:
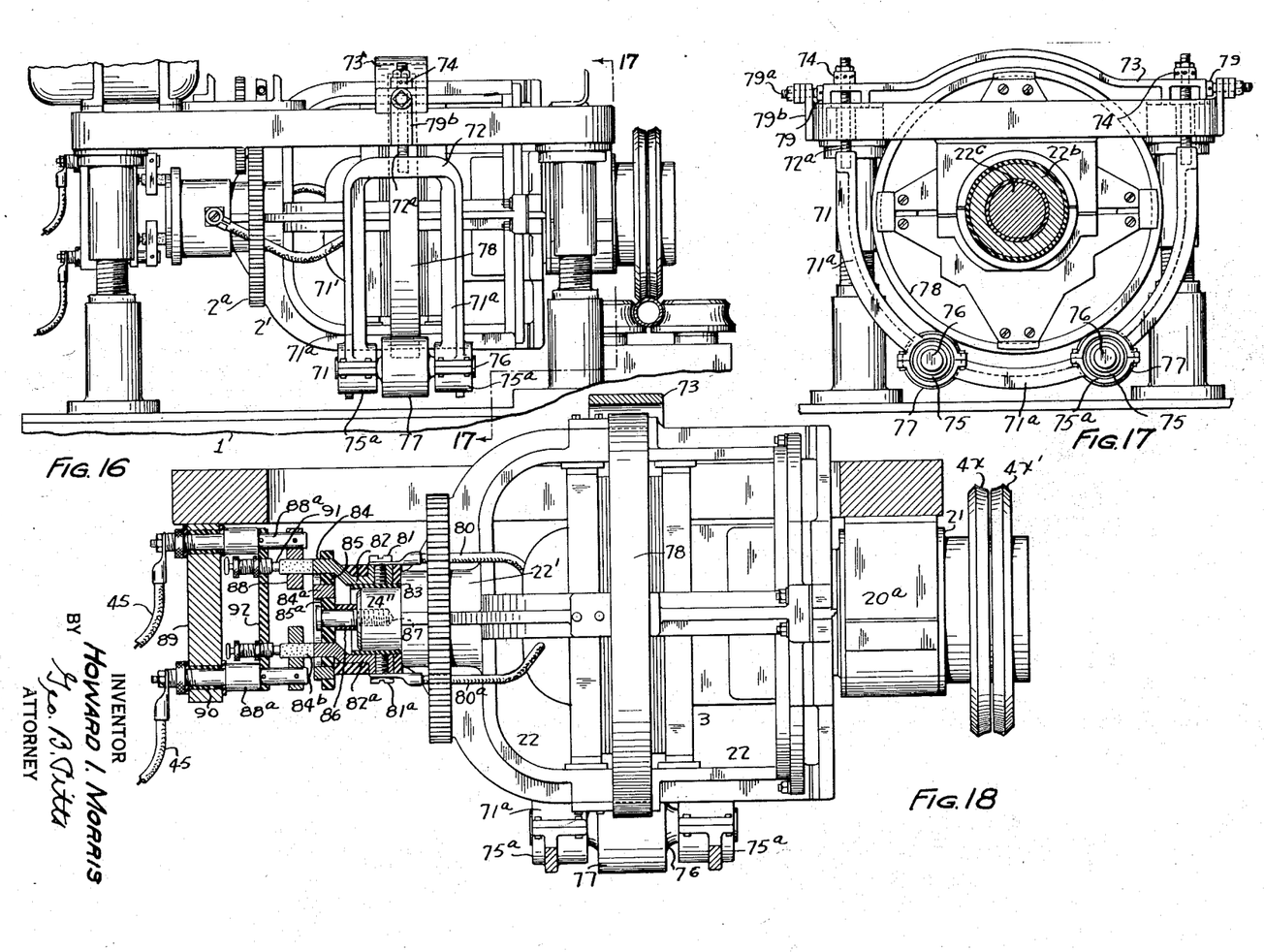
Fig. 16 is a fragmentary elevation of a welding apparatus showing a different embodiment of the invention.
Fig. 17 is a section on the line 17—17 of Fig. 16.
Fig. 18 is a view partly in section of parts shown in Fig. 16, enlarged.

Figs. 16, 17 and 18 illustrate a further modified form of construction wherein the bearing remote from the electrodes 4x, 4x', for the rotatable mounting 2' is arranged to permit ready access to the connections through which the current is supplied to the primary windings 3a. In these views the transformer 3, supporting member 22 therefor, conductor devices 22b, 22c, electrodes 4x, 4x', and the bearing 21 in which the devices 22b, 22c, rotate, are similar to like parts shown in Figs. 1 to 7, inclusive, but the other bearing, indicated as an entirety at 71, is modified and located in line with the transformer 3, due to its weight, and co-operates with the bearing 21 to rotatably support the transformer and its mounting. The bearing 71 comprises a cradle, indicated as an entirety at 71' consisting of a pair of spaced curvilinear bars 71a connected together at their opposite ends by end bars 72 (one thereof being shown in Fig. 16), which are formed with threaded openings to receive screws 72a. The screws 72a extend upwardly through openings formed in a cross bar 73, which rests on the frame 9, and are provided with nuts 74 which engage the cross bar 73 to support the cradle on the frame 9. The bottom portions of the bars 71a at opposite sides of their centers are provided with pairs of alined recesses for suitable bearings 75, which are secured in the recesses by caps 75a. Each pair of bearings 75 supports the opposite ends of a shaft 76 to which is fixed, between the adjacent bearings, a roll 77. A ring 78, which surrounds the member 22 and is fixed to the bars 23 thereof in any desired manner, has rolling engagement with the rolls 77 to cooperate with the bearing 21 to rotatably support the member 22 and permit it to rotate due to the engagement of the electrodes with the moving work. By the adjustment of the nuts 74, the cradle 71' may be raised or lowered, and by the adjustment of nuts 79 which engage the opposite ends of the cross bar 73 to hold it in position, the cradle may be moved laterally, such adjustments serving to so position the bearing 71 that the member 22 is supported in line with and rotates about the axis of the bearing 21. The nuts 79 are threaded on pins 79a suitably mounted in brackets 79b extending upwardly from the side walls of the frame 9 (see Fig. 17).

The electrical connections to the primary windings 3a comprise the following: 80, 80a, indicate leads leading from the windings to terminals 81, 81a, which are mounted in conductors 82, 82a, respectively, diametrically disposed on the outer end portion of the shaft 24" which extends outwardly from the hub 22' of the member 22. The conductors 82, 82a, are insulated from each other by suitable insulation material similarly to that shown in Figs. 5 and 6, and from the shaft 24" by a sleeve of insulation material 83 and from the hub 22' by an annulus formed of insulation material 83a. The conductors 82, 82a, extend longitudinally of the shaft and terminate at their outer ends in rings 84, 84a, respectively, which operate to collect the current from brushes 84b. As shown in Fig. 18, the ring 84a is of a size to fit within and in spaced concentric relation to the ring 84. A collar 85 formed of insulation material serves as a spacer between the rings and a disk 85a of insulation material is mounted within the ring 84a, the disk being secured, through a collar 86, to the shaft 24" by a screw 87, to insure a fixed relation between the rings 84, 84a, as they rotate. Each of the brushes 84b is slidably mounted in a bar 88 formed of suitable conducting material and carried on the inner end of a terminal 88a, the outer end portion of which extends through and is mounted in an opening formed in a bracket 89 depending from the frame 9. Each terminal is connected to a lead 45. Each terminal 88a is insulated from the wall of its supoprting opening by a sleeve 90 formed of insulation material. Each brush 84a is acted upon by a spring operated plunger 91, the casing for the plunger and its spring being threaded into an opening formed in a section 92 formed of insulation material and supported by the inner end portions of the terminals 88a.

Figure 11:
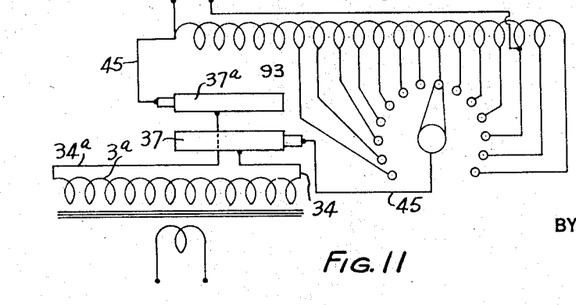
Fig. 11 is a diagrammatic view.
Figure 12:
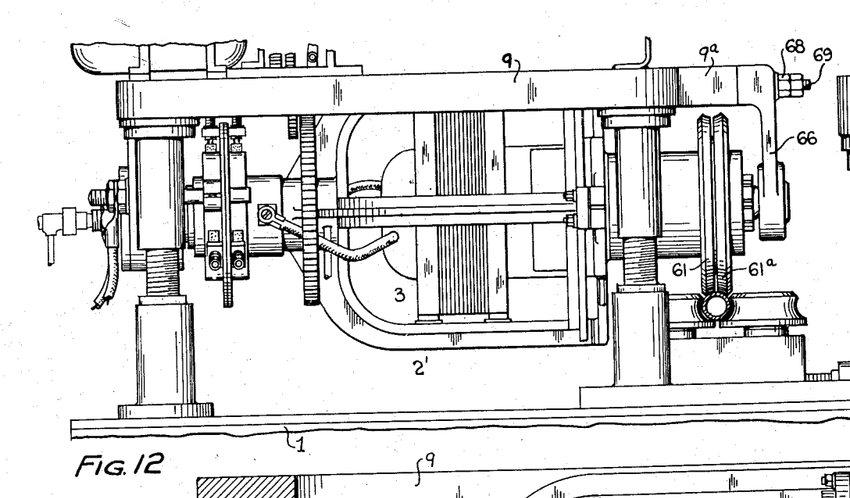
Fig. 12 is a fragmentary elevation of a welding apparatus wherein the mounting is slightly modified.
Figures 13, 15:
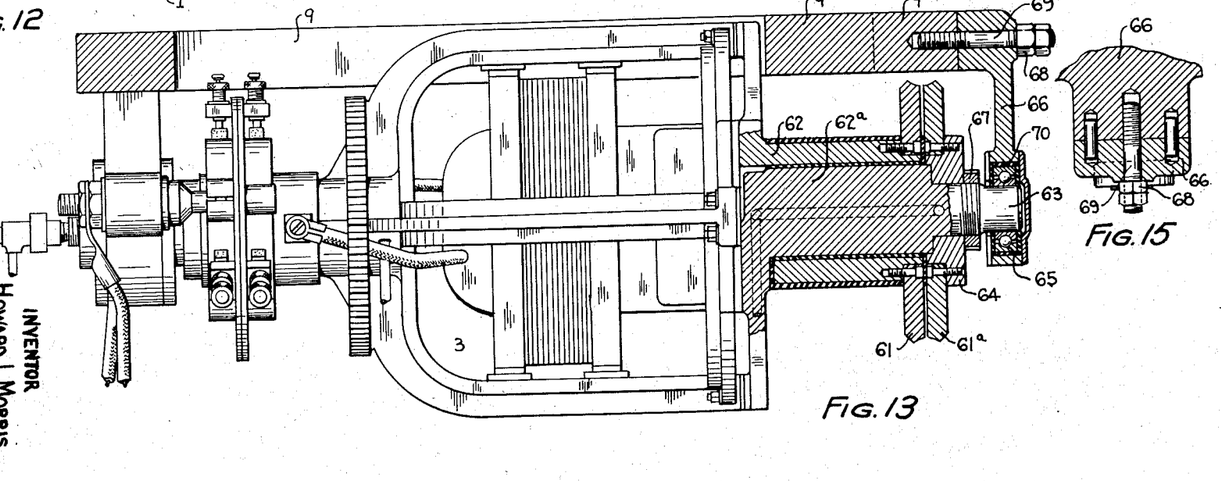
Fig. 13 is a view of parts shown in Fig. 12, somewhat enlarged, with parts in section.
Fig. 15 is a section on the line 15—15 of Fig. 14.
Figure 14:
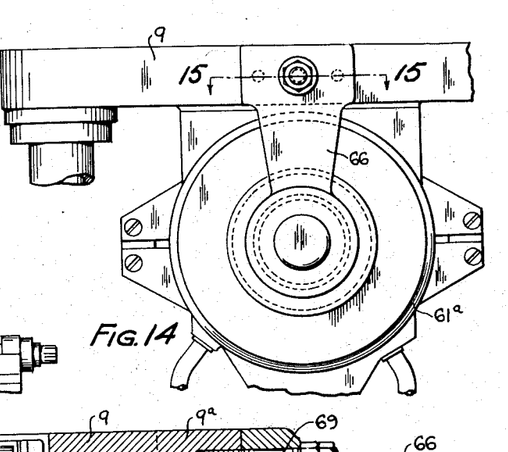
Fig. 14 is a fragmentary elevation looking toward the left of Fig. 12.

Fig. 11 shows diagrammatically the transformer circuit which includes an auto-transformer 93 having a tap switch, the auto-transformer illustrating the preferred means for controlling the current supplied to the electrodes for welding.

In operation, the rolls 6 operate to substantially close the pipe seam, the contact therebetween serving to set up a high resistance path for the flow of the current thereacross so that the resulting heat causes a fusion of the metal. As the electrodes are closely related, the path for the current is short through the pipe seam so that only a small portion of the current flows around the pipe. As already set forth, the frame 9 is adjustable vertically so that the electrodes may be caused to engage the pipe with sufficient pressure to insure an adequate electrical contact therewith, as well as to insure a rotation of the electrodes by the moving pipe.

The capacity of the transformer 3, the size of the conductor devices and electrodes will depend upon the thickness of the metal to be welded and also the speed at which welding takes place. The electrodes are preferably formed of a suitable copper alloy.

From the foregoing description it will be noted that I provide a rotatable mounting for a transformer of conventional construction and conductors of minimum length between the terminals of the secondary windings and the electrodes, the conductors forming a part of the mounting so that the transformer, the electrodes and conductors to the latter rotate as a unit. By this construction, the structural arrangement is simplified, current losses are substantially eliminated and the cost of installation is materially reduced.

To those skilled in the art to which my invention relates, many changes in construction and widely differing embodiments and applications of the invention will suggest themselves without departing from the spirit and scope of the invention. My disclosures herein are purely illustrative and not intended to be in any sense limiting.

What I claim is:

1. In welding apparatus, the combination with a support, of a mounting comprising a sectional member the sections of which are insulated from each other, a transformer carried by one section of said member, the remaining sections of said member consisting of conductor devices each being rigidly attached to said first section and electrically connected to one terminal of the secondary winding of said transformer, an electrode connected to each of said devices and movable therewith, spaced bearings on said support respectively engaging said first-named section and said conductor devices for rotatably supporting said sectional member, and electrical connections for the primary winding of said transformer.

2. In welding apparatus, the combination with a support and spaced bearings carried thereby, of a mounting comprising a sectional member the sections of which are insulated from each other, a transformer carried by one section of said member, the remaining sections consisting of conductor devices each being rigidly attached to said first section and electrically connected to one terminal of the secondary winding of said transformer and extending through and mounted in one of said bearings to rotatably support one end of said member, means for rotatably supporting the opposite end of said member in the other bearing, an electrode connected to each of said devices and movable therewith, and electrical connections for the primary winding of said transformer.

3. Welding apparatus as claimed in claim 2 wherein the conductor devices are arranged concentrically and carry the electrodes at their outer ends.

4. Welding apparatus as claimed in claim 2 wherein the conductor devices are of substantially semi-circular shape in cross section and disposed in side by side relation and carry the electrodes at their outer ends.

5. Welding apparatus as claimed in claim 1 wherein one of said bearings is arranged outwardly of said electrodes and said conductor devices are concentrically related and the inner device is extended and rotatably mounted in said bearing.

6. In welding apparatus, the combination with a support and spaced bearings thereon, of a sectional member comprising a hub section and other sections rigidly attached to one end of said hub section but insulated therefrom and rotatably supported by one of said bearings and formed of conducting material, a transformer carried by said hub section and having the terminals of its secondary winding electrically connected to said other sections, respectively, an electrode connected to the outer end portion of each of said other sections, a shaft connected to the opposite end of said hub section and mounted in the other bearing, and electrical connections for the primary winding of said transformer.

7. Welding apparatus as claimed in claim 1 wherein one of said bearings is arranged intermediate the ends of the section which carries the transformer and substantially in the plane thereof.

8. In welding apparatus, the combination with a support, of a mounting comprising a sectional member, a transformer carried by one section of said member, the remaining sections of said member consisting of conductor devices each electrically connected to one terminal of the secondary winding of said transformer, an electrode connected to each of said devices and movable therewith, spaced bearings on said support for rotatably supporting said member, one of said bearings comprising a cradle carried by said support and provided with rolls and a ring surrounding said mounting and engaging said rolls, and electrical connections for the primary winding of said transformer.

9. In apparatus for resistance welding, a support, aligned spaced bearings on said support, a shaft in one of said bearings, a hub on said shaft, spaced arms rigidly connected with said hub, a transformer carried by said arms, primary transformer terminals on said shaft, a sectional shaft running through the second bearing on the support, said sectional shaft having portions rigidly connected to the ends of said arms and electrically insulated from each other and from the said arms, each of said shaft portions being electrically connected to a secondary transformer winding, and an electrode electrically secured to the outer end of each shaft portion.

10. In welding apparatus, the combination with a support, of spaced bearings thereon, a mounting comprising a sectional member, one section of said member comprising an open frame having a shaft extending outwardly from one end thereof and mounted in one of said bearings, a transformer carried within the frame of said section of said member, the remaining sections of said member being secured to said first mentioned section and rotatably engaging the other bearing, said remaining sections consisting of conductor devices each electrically connected to one terminal of the secondary winding of said transformer, an electrode electrically connected to each of said devices and movable therewith, and electrical connections for the primary winding of said transformer.

HOWARD I. MORRIS.